United States Patent
Chen et al.

(10) Patent No.: US 10,752,813 B2
(45) Date of Patent: Aug. 25, 2020

(54) GLUE FILLING METHOD FOR MULTILAYER THIN FILM SENSOR STRUCTURE

(71) Applicants: INTERFACE TECHNOLOGY (CHENGDU) CO., LTD., Chengdu (CN); INTERFACE OPTOELECTRONICS (SHENZHEN) CO., LTD., Shenzhen (CN); GENERAL INTERFACE SOLUTION LIMITED, Miaoli County (TW)

(72) Inventors: Sheng Che Chen, Shenzhen (CN); Yi-Hung Ho, Shenzhen (CN)

(73) Assignees: Interface Technology (Chengdu) Co., Ltd., Chengdu, Sichuan (CN); Interface Optoelectronics (Shenzhen) Co., Ltd., Shenzhen, Guangdong (CN); General Interface Solution Limited, Miaoli County (TW)

( * ) Notice: Subject to any disclaimer, the term of this patent is extended or adjusted under 35 U.S.C. 154(b) by 141 days.

(21) Appl. No.: 16/051,809

(22) Filed: Aug. 1, 2018

(65) Prior Publication Data

US 2020/0010737 A1    Jan. 9, 2020

(30) Foreign Application Priority Data

Jul. 9, 2018    (CN) .......................... 2018 1 0744459

(51) Int. Cl.
*B29C 65/00* (2006.01)
*C09J 9/02* (2006.01)
(Continued)

(52) U.S. Cl.
CPC . *C09J 9/02* (2013.01); *C09J 5/00* (2013.01); *G01L 1/205* (2013.01); *B29C 65/70* (2013.01);
(Continued)

(58) Field of Classification Search
CPC ..... B32B 38/10; B32B 43/006; Y10T 156/11; Y10T 156/1168; Y10T 156/19;
(Continued)

(56) References Cited

U.S. PATENT DOCUMENTS

2016/0362586 A1* 12/2016 Kiyoto ........................ C09J 7/29
2017/0356868 A1* 12/2017 Asmus ................. G01N 27/043
(Continued)

*Primary Examiner* — Mark A Osele
*Assistant Examiner* — Nickolas R Harm
(74) *Attorney, Agent, or Firm* — Rosenberg, Klein & Lee (57) ABSTRACT

A glue filling method for a multilayer thin film sensor structure is disclosed herein. Two outer layers of a composite heat-resistant membrane are carved to have desired patterned holes; an inner layer is interposed between two outer layers to form a layered structure. The composite heat-resistant membrane is stuck onto the multilayer thin film sensor structure with the patterned holes aligned to an electric-conduction through-hole of the multilayer thin film sensor structure to form a filling region. A conductive glue is filled into the filling region. Sustained by the inner-layer heat-resistant membrane, the conductive glue protrudes from the patterned hole to cover a portion of the conductive metals on the surface of the multilayer thin film sensor structure. Thereby are simultaneously achieved a waterproof effect, an airtight effect and a fine interface compatibility.

9 Claims, 8 Drawing Sheets

(51) Int. Cl.
*C09J 5/00* (2006.01)
*G01L 1/20* (2006.01)
*B29C 65/70* (2006.01)
*B29C 65/74* (2006.01)
*B29C 65/78* (2006.01)
*B32B 38/10* (2006.01)
*B32B 43/00* (2006.01)
*B29C 65/76* (2006.01)

(52) U.S. Cl.
CPC ............ *B29C 65/741* (2013.01); *B29C 65/76* (2013.01); *B29C 65/7808* (2013.01); *B29C 65/7844* (2013.01); *B29C 66/02242* (2013.01); *B29C 66/304* (2013.01); *B29C 66/41* (2013.01); *B29C 66/723* (2013.01); *B29C 66/72321* (2013.01); *B29C 66/73141* (2013.01); *B32B 38/10* (2013.01); *B32B 43/006* (2013.01); *Y10T 156/11* (2015.01); *Y10T 156/1168* (2015.01); *Y10T 156/19* (2015.01)

(58) Field of Classification Search
CPC ....... B29C 65/70; B29C 65/74; B29C 65/741; B29C 65/76; B29C 65/7808; B29C 65/7844; B29C 66/02242; B29C 66/304; B29C 66/41; B29C 66/723; B29C 66/72321; B29C 66/73141; C09J 9/02
See application file for complete search history.

(56) References Cited

U.S. PATENT DOCUMENTS

2017/0362697 A1* 12/2017 Richter .................. B32B 33/00
2018/0129317 A1*  5/2018 Ryu ........................ G02B 1/14
2018/0178245 A1*  6/2018 Yamada ................ B05D 1/005

* cited by examiner

GLUE FILLING METHOD FOR MULTILAYER THIN FILM SENSOR STRUCTURE

This application claims priority for China patent application no. 201810744459.0 filed on Jul. 9, 2018, the content of which is incorporated by reference in its entirety.

BACKGROUND OF THE INVENTION

Field of the Invention

The present invention relates to a multilayer thin film sensor structure, particularly to a glue filling method for a multilayer thin film sensor structure, which can guarantee electric conductivity.

Description of the Related Art

Owing to advance of science and technology, portable electronic devices, such as notebook computers, tablet computers, smart phones, etc., have been very popular in daily life, and the functions thereof are being enhanced persistently. The portable electronic devices normally have a touchscreen, which not only displays audio and video multimedia information to users but also provides a convenient operating interface for users. Recently, manufacturers have tended to equip portable electronic devices with a larger touchscreen to make consumers operate them more convenient and flexibly.

Figure 1:
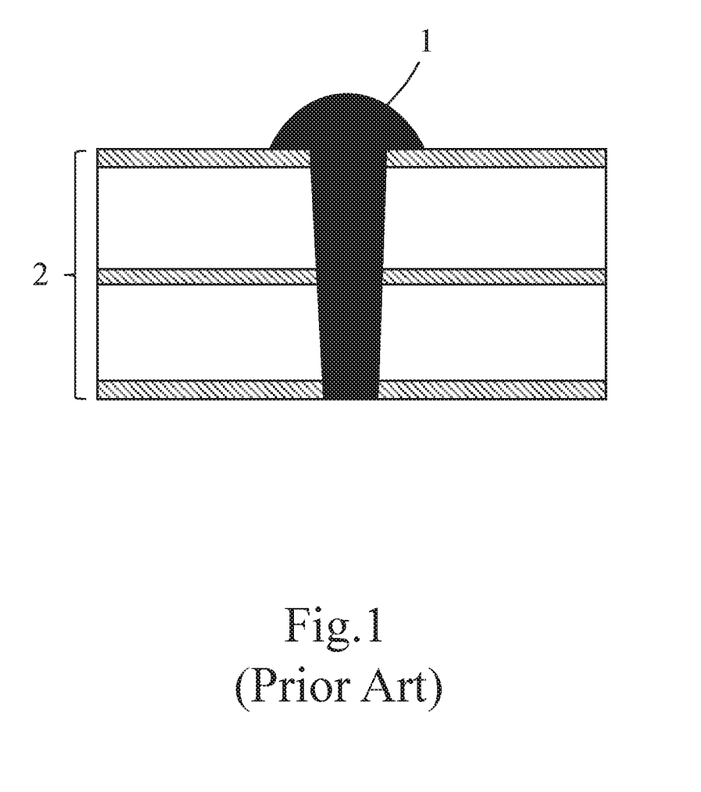
FIG. 1 is a diagram schematically showing that the conventional technology fails in glue-filling.

The more sophisticated the functions of touchscreens grow, the more complicated the fabrication process thereof would be. The existing technology has been hard to meet demand. The traditional manufacture process is likely to fail in filling conductive glue for the current multilayer thin film sensor structures. Refer to FIG. 1. The conventional technology forms the conductive glue 1 to have an upper conductive bump on the top thereof to cove a portion of the upper conductive metal layer of the thin film sensor structure 2. However, the conventional technology fails to form a lower conductive bump on the bottom of the conductive glue 1. Besides, while the conductive glue 1 is filled into the electric-conduction through-holes, the conventional technology may suffer incomplete glue filling or fail to electrically connect the conductive metal layers, which would disable the signal communication between the upper and lower layers of the thin film sensor structure 2.

Accordingly, the present invention proposes a glue filling method for a multilayer thin film sensor structure, which can form the conductive glue into the desired shapes and enables the signal communication of the multilayer thin film structure, to effectively solve the problems of the conventional technology.

SUMMARY OF THE INVENTION

The primary objective of the present invention is to provide a glue filling method for a multilayer thin film sensor structure, which uses a multilayer composite heat-resistant membrane to facilitate forming an arc-shaped bump on the bottom of the conductive glue in the glue filling process, whereby the conductive glue can cover a portion of the lower conductive metal layer to enable the electric connection of the multilayer thin film sensor structure, and whereby are achieved a water-proof effect and an airtight effect, and whereby is acquired a fine interface compatibility.

In order to achieve the abovementioned objective, the present invention proposes a glue filling method for a multilayer thin film sensor structure, which comprises steps: providing a multilayer thin film sensor structure having an upper surface, a lower surface and an electric-conduction through-hole penetrating the upper surface and the lower surface; providing a composite heat-resistant membrane including at least a first heat-resistant membrane, a second heat-resistant membrane and a third heat-resistant membrane, wherein a first patterned hole and a second patterned hole are respectively form in the first heat-resistant membrane and the second heat-resistant membrane, corresponding to each other, and separately penetrating the first heat-resistant membrane and the second heat-resistant membrane, and wherein the sizes of the first patterned hole and the second patterned hole are larger than the size of the electric-conduction through-hole, and wherein the third heat-resistant membrane is arranged between the first heat-resistant membrane and the second heat-resistant membrane; sticking the composite heat-resistant membrane to the lower surface of the multilayer thin film sensor structure and aligning the first patterned hole to the electric-conduction through-hole to make the electric-conduction through-hole and the first patterned hole form a filling region; filling a conductive glue into the filling region and letting the conductive glue protrude from the filling region toward the second patterned hole with the third heat-resistant membrane sustaining the conductive glue to form an arc-shaped bump; curing the conductive glue to form an electric-conduction plug, and peeling off the composite heat-resistant membrane.

In one embodiment, the conductive glue is cured in a thermosetting method.

In one embodiment, the method of the present invention further comprises a step: after the conductive glue is cured, using an optical release method or a thermal release method to decrease the stickiness of the composite heat-resistant membrane and then peeling off the composite heat-resistant membrane.

In one embodiment, the electric-conduction plug includes an upper cover and a lower cover, which respectively protrude from the upper surface and the lower surface and have arc shapes. The diameter of the upper cover is larger than the upper diameter of the electric-conduction through-hole. The diameter of the lower cover is larger than the lower diameter of the electric-conduction through-hole. The upper surface and lower surface of the multilayer thin film sensor structure respectively have a plurality of conductive metals. Each of the upper cover and the lower cover covers a portion of the conductive metals.

In one embodiment, the multilayer thin film sensor structure includes at least a first sensing film and a second sensing film, and the electric-conduction through-hole penetrates the first sensing film and the second sensing film.

In one embodiment, the first heat-resistant membrane and the second heat-resistant membrane are adhesive heat-resistant membranes; the third heat-resistant membrane is a non-adhesive heat-resistant membrane.

The glue filling method for a multilayer thin film sensor structure of the present invention is characterized in using a multilayer composite heat-resistant membrane whose two outer layers have patterned holes with desired shapes and whose middle layer functions as a sustaining layer. The patterned holes of the composite heat-resistant membrane are aligned to the electric-conduction through-hole of the multilayer thin film sensor structure to form a filling region. Next, the composite heat-resistant membrane is stuck onto the multilayer thin film sensor structure. Then, a conductive glue is fully filled into the filling region to form an arc-shaped convex lower cover, whereby to enable electric conduction of the multilayer thin film sensor structure, achieve a water-proof effect and an airtight effect, and acquire a fine interface compatibility.

Below, embodiments are described in detail in cooperation with the attached drawings to make easily understood the objectives, technical contents, characteristics and accomplishments of the present invention.

DETAILED DESCRIPTION OF THE INVENTION

The present invention discloses a glue filling method for a multilayer thin film sensor structure, which is applicable to multilayer thin film sensor structures and characterized in using a composite heat-resistant membrane to function as a sustaining layer in filling a conductive glue, whereby the conductive glue is fully filled into the electric-conduction through-hole and formed to be a convex cover having a special shape for covering the conductive metal on the bottom of the multilayer thin film sensor structure.

Figure 2:
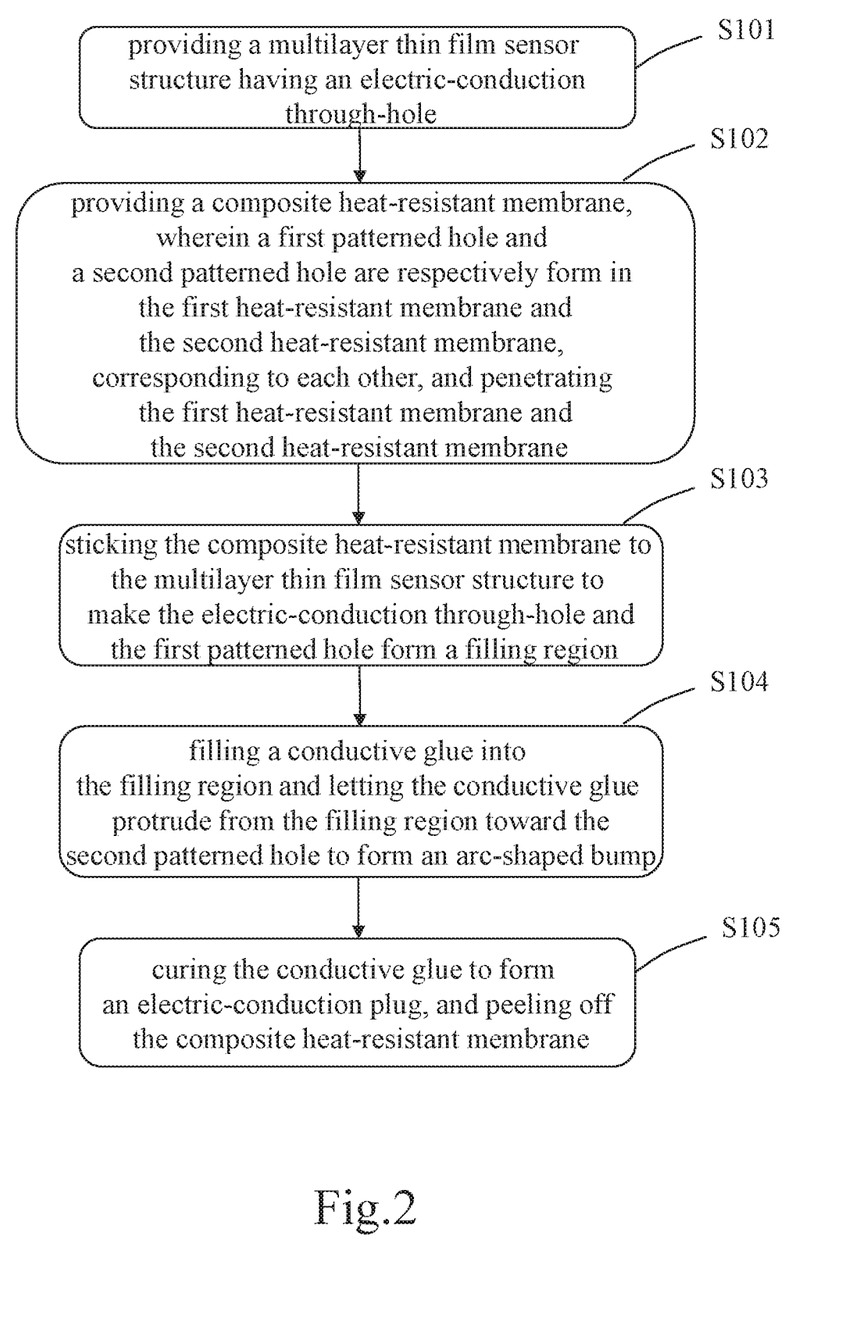
FIG. 2 shows a flowchart of a glue filling method for a multilayer thin film sensor structure according to one embodiment of the present invention.

Refer to FIG. 2 for a flowchart of a glue filling method for a multilayer thin film sensor structure according to one embodiment of the present invention. Also refer to FIGS. 3-7, which are diagrams schematically showing the steps of a glue filling method for a multilayer thin film sensor structure according to one embodiment of the present invention. The method of the present invention comprises Steps S101-S105.

Figure 3:
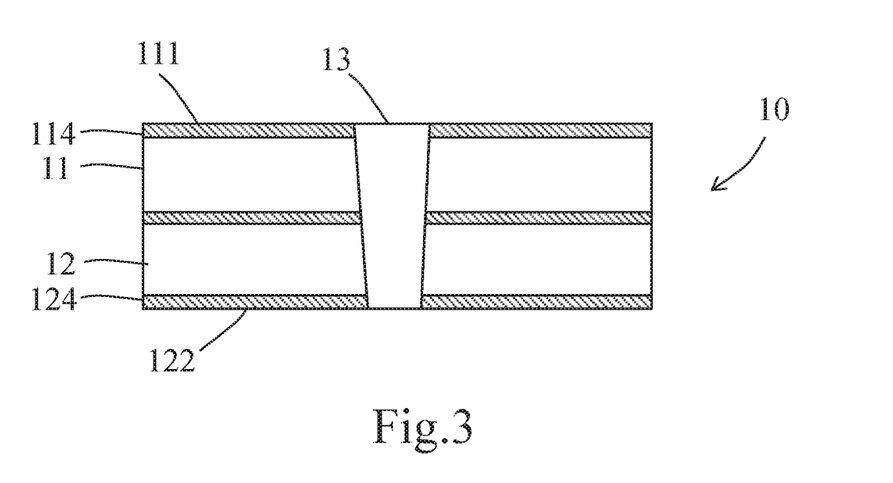
FIG. 3 is a sectional view schematically showing a multilayer thin film sensor structure used in one embodiment of the present invention.

In Step S101, provide a multilayer thin film sensor structure 10, which includes an upper surface 111, a lower surface 122 and an electric-conduction through-hole 13 penetrating the upper surface 111 and the lower surface 122, as shown in FIG. 3. A plurality of conductive metals 114 and 124 is respectively disposed on the upper surface 111 and the lower surface 122 of the multilayer thin film sensor structure 10. In the embodiment shown in FIGS. 3-7, the multilayer thin film sensor structure 10 further includes at least a first sensing film 11 and a second sensing film 12. The electric-conduction through-hole 13 penetrates the first sensing film 11 and the second sensing film 12. In present invention, the multilayer thin film sensor structure 10 may be a structure of two, three or more layers. The sensing film is made of a transparent conductive material, such as indium tin oxide (ITO) or zinc oxide (ZnO).

Figure 4:
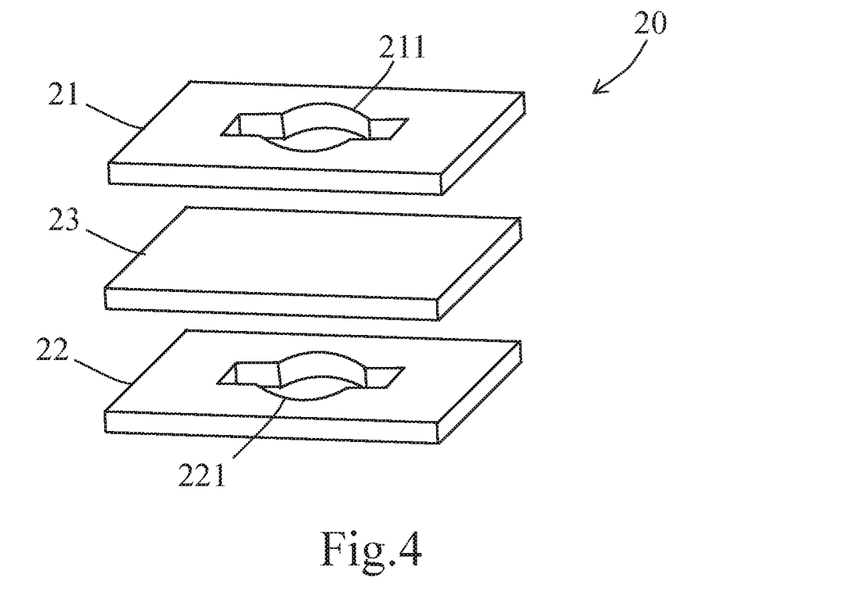
FIG. 4 is an exploded view schematically showing a composite heat-resistant membrane used in one embodiment of the present invention.

In Step S102, provide a composite heat-resistant membrane 20, as shown in FIG. 4. The composite heat-resistant membrane 20 is a layered structure having three or more layers. Two outer layers of the composite heat-resistant membrane 20 are adhesive ones. The outer layer may be a single-sided or double-sided adhesive layer, stuck to the multilayer thin film sensor structure 10 and used to form the layered structure. The stickiness of the outer layer may be decreased in an optical release method or a thermal release method. The inner layer of the composite heat-resistant membrane 20 is a non-adhesive one. The ductility of the inner layer enables it to function as a sustaining layer of the glue filling region for forming an arc-shaped bump. The two outer layers and the inner layer of the composite heat-resistant membrane 20 are respectively defined as a first heat-resistant membrane 21, a second heat-resistant membrane 22 and a third heat-resistant membrane 23. Holes having desired shapes are respectively carved in the first heat-resistant membrane 21 and the second heat-resistant membrane 22 and defined as a first patterned hole 211 and a second patterned hole 221. The inner diameters of the first patterned hole 211 and the second patterned hole 221 are larger than the lower diameter of the electric-conduction through-hole 13 of the multilayer thin film sensor structure 10. The third heat-resistant membrane 23 is interposed between the first heat-resistant membrane 21 and the second heat-resistant membrane 22. In one embodiment, the composite heat-resistant membrane 20 is made of a material, which is water-proof and able to endure a temperature of 80☐, such as polyethylene (PE), polyethylene terephthalate (PET), poly(methyl methacrylate) (PMMA), or a rubber. The material may be in form of a heat-resistant resin, a heat-resistant tape, or a combination thereof.

Figure 5:
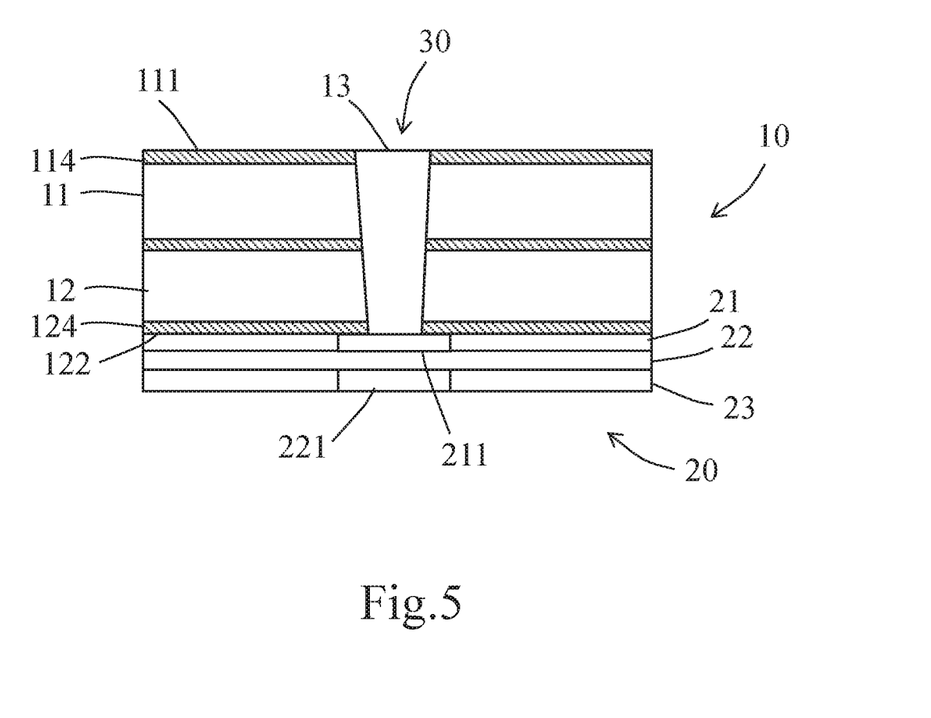
FIG. 5 is a diagram schematically showing that a composite heat-resistant membrane is stuck onto a multilayer thin film sensor structure according to one embodiment of the present invention.

In Step S103, after the heat-resistant membranes are assembled in an adhesive method to form the composite heat-resistant membrane 20, align the first patterned hole 211 to the electric-conduction through-hole 13 and stick the composite heat-resistant membrane 20 onto the lower surface 122 of the multilayer thin film sensor structure 10 to make the electric-conduction through-hole 13 and the first patterned hole 211 jointly form a filling region 30 where a conductive glue will be filled, as shown in FIG. 5.

Figure 6:
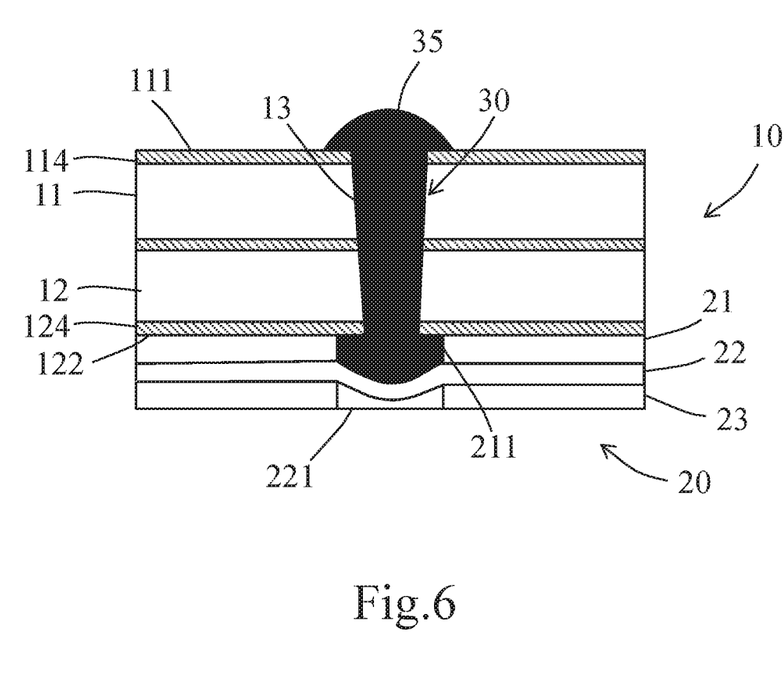
FIG. 6 is a diagram schematically showing that a conductive glue is filled into the filling region and that the conductive glue protrudes to form an arc-shaped bump with the middle layer of the composite heat-resistant membrane sustaining the conductive glue according to one embodiment of the present invention.

In Step S104, fill a conductive glue 35 into the filling region 30 fabricated in Step S103, as shown in FIG. 6. Sustained by the third heat-resistant membrane 23, the conductive glue 35 protrudes from the filling region 30 toward the second patterned hole 221 to form an arc-shaped bump.

Figure 7:
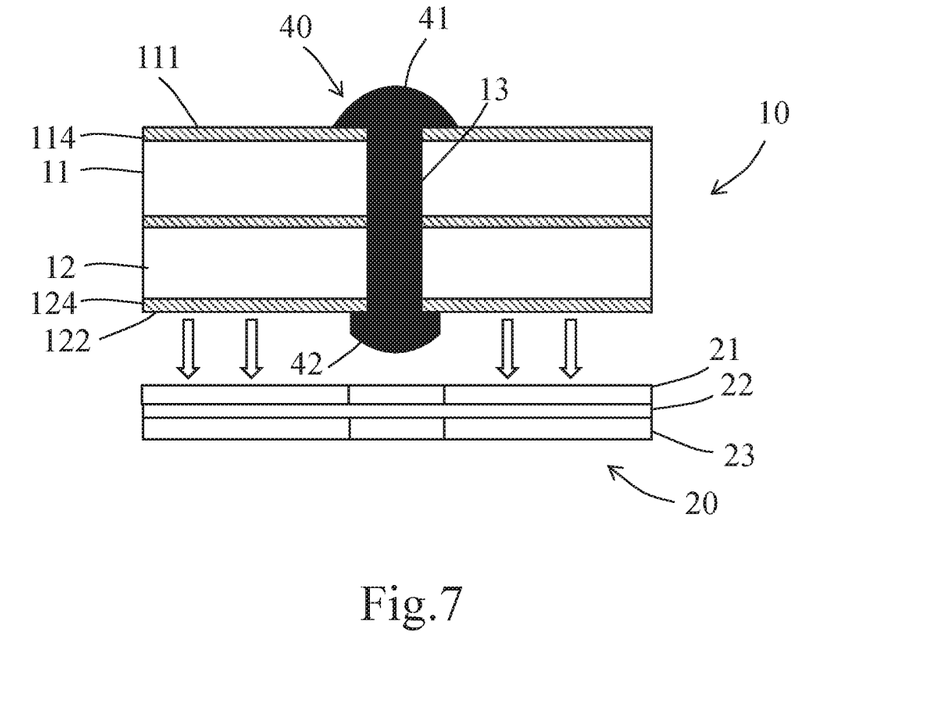
FIG. 7 is a diagram schematically showing that the composite heat-resistant membrane is then peeled off after the conductive glue has been cured according to one embodiment of the present invention.

In Step S105, cure the conductive glue 35, which is filled in Step S104, at a high temperature to form an electric-conduction plug 40; decrease the stickiness of the composite heat-resistant membrane 20 in an UV release method, and peel off the composite heat-resistant membrane 20, as shown in FIG. 7. In the present invention, an optical release method or a thermal release method may be used to decrease the stickiness of the composite heat-resistant membrane 10. In the present invention, the electric-conduction plug 40 may have convex covers, including an upper cover 41 having an arc shape and protruding from on the upper surface 111 of the multilayer thin film sensor structure 10 and a lower cover 42 having an arc shape and protruding from the lower surface 122 of the multilayer thin film sensor structure 10. In one embodiment, the diameter of the upper cover 41 of the electric-conduction plug 40 is larger than the upper diameter of the electric-conduction through-hole 13; the diameter of the lower cover 42 is larger than the lower diameter of the electric-conduction through-hole 13; the upper cover 41 and the lower cover 42 respectively cover a portion of the conductive metal 114 on the upper surface 111 and a portion of the conductive metal 124 on the lower surface 122. Each of the upper cover 41 and the lower cover 42 may have an arbitrary contour.

Figure 8:
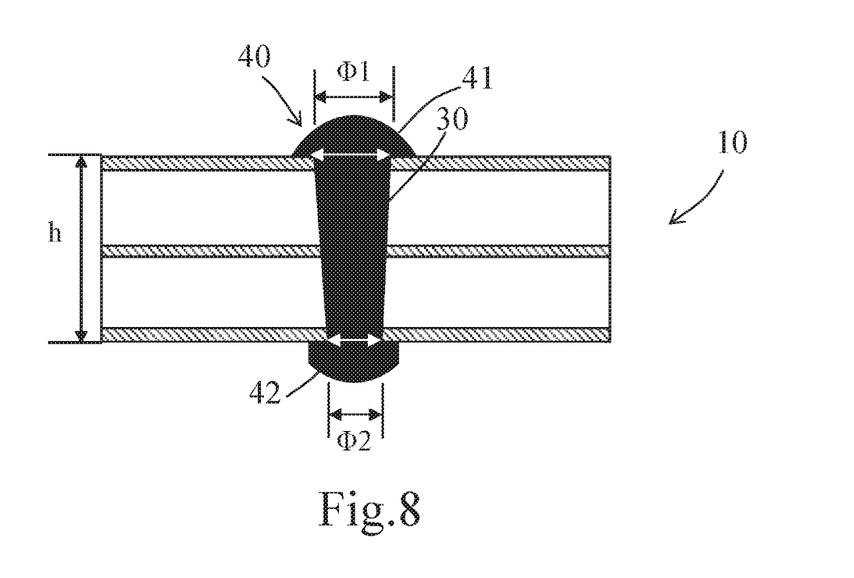
FIG. 8 and FIG. 9 are diagrams schematically showing the parameters used in the specification of the electric-conduction plug according to one embodiment of the present invention.
Figure 9:
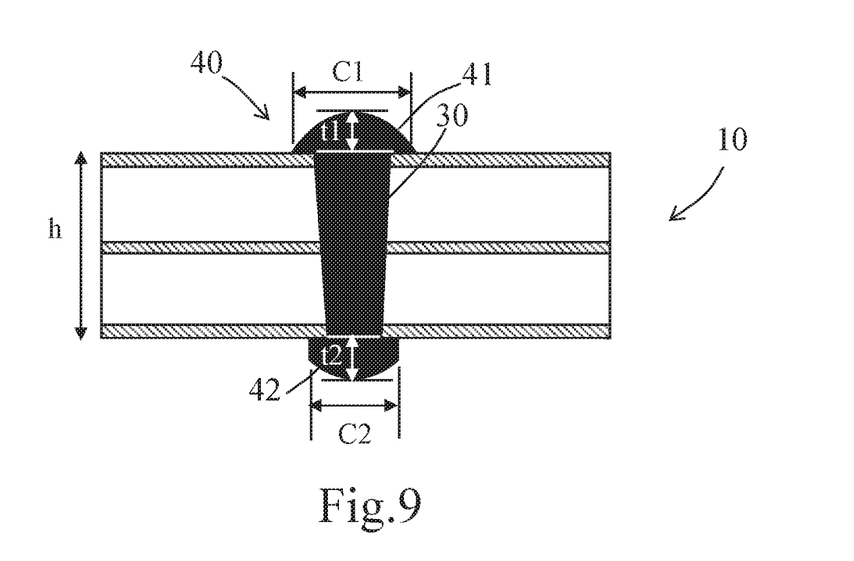

Refer to FIG. 8 and FIG. 9 for the parameters used in the specification of the electric-conduction plug 40. Refer to Table. 1 for an example of the specification of the multilayer thin film sensor structure 10. Table. 1 lists the values of the thickness h of the multilayer thin film sensor structure 10 and the diameters of the electric-conduction through-hole 13, wherein $\Phi 1$ is the upper diameter, and $\Phi 2$ is the lower diameter. Refer to Table. 2 for an example of the specification of the electric-conduction plug 40. Table. 2 lists the values of the diameter C1 of the upper cover 41, the diameter C2 of the lower cover 42, the height t1 of the upper cover 41, and the height t2 of the lower cover 42. Refer to Table. 3 for an example of the specification of the conductive glue. Table. 3 lists the values of the viscosity, curing temperature and volume resistance of the conductive glue.

TABLE 1

| $\Phi 1$ | 100-300 μm |
| $\Phi 2$ | 0.5-1*$\Phi 1$ |
| h | 50-300 μm |

TABLE 2

| C1 | 1-3*$\Phi 1$ |
| C2 | 1-3*$\Phi 2$ |
| t1 | 0.01-0.1 h |
| t2 | 0.01-0.1 h |

TABLE 3

| viscosity | 1500-30000 cps |
| Curing temperature | ≤120° C. |
| Volume resistance | 1-5 ($10^{-3}$ Ω/cm) |

Figure 10:
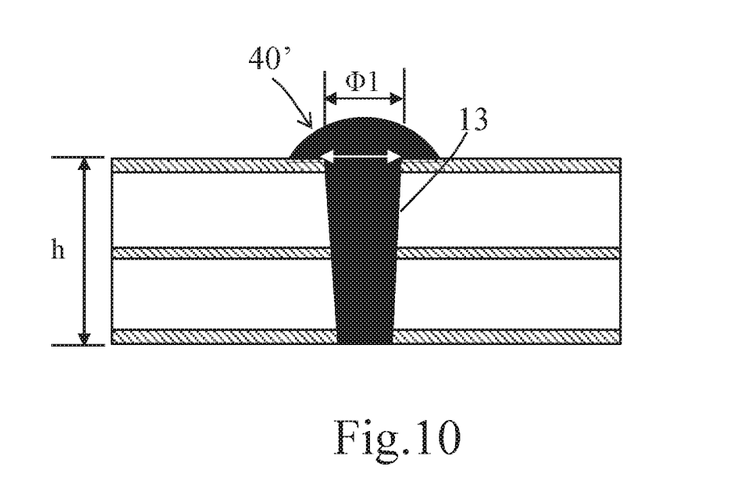
FIG. 10 is a diagram schematically showing a result obtained with the traditional glue filling method.
Figure 11:
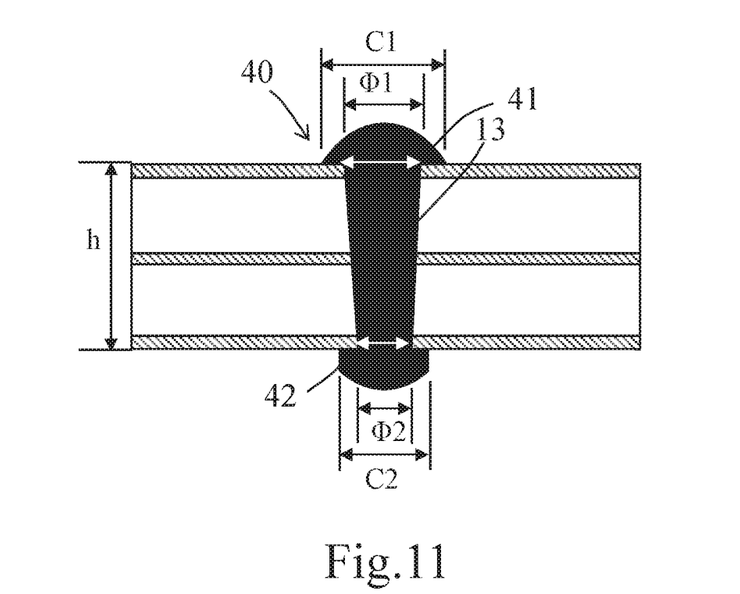
FIG. 11 is a diagram schematically showing a result obtained with the glue filling method of the present invention.

Refer to FIG. 10 and FIG. 11 for the comparison of the results obtained with the traditional glue filling method and the glue filling method of the present invention. The traditional method can fabricate the electric-conduction plug 40' where only the electric-conduction through-hole 13 is fully filled. Because the conductive glue with good formability has high viscosity, it is less likely to use the conductive glue to form the lower cover. Thus, the conductive metal on the lower surface is not covered by the conductive glue, and the electric conduction of the multilayer thin film sensor structure is not successfully realized. In the present invention, the conductive glue is not only fully filled into the electric-conduction through-hole 13 but also fabricated into the lower cover 42 with a lower diameter $\Phi 2$. Thus, the present invention is exempted from the conventional disadvantages. Table. 4 lists the viscosity of the conductive glue and the results of the experiment for verifying the method of the present invention.

TABLE 4

| Viscosity of conductive glue | 15000 cps |
| h | 74 μm |
| $\Phi 1$ | 100 μm |
| $\Phi 2$ | 75 μm |
| C1 | 0.27 mm |
| C2 | 0.157 mm |

In conclusion, the present invention proposes a glue filling method for a multilayer thin film sensor structure, which uses a composite heat-resistant membrane containing two outer layers and a middle layer, wherein a conductive glue is filled into an electric-conduction through-hole of the multilayer thin film sensor structure with the middle heat-resistant layer being a sustaining layer to form an arc-shaped bump on the bottom of the conductive glue according to the contour of the patterned hole of the outer layer, whereby the conductive metal on the bottom of the multilayer thin film sensor structure is covered by the conductive glue, and whereby the electric conduction of the multilayer thin film sensor structure is enabled, and whereby a water-proof effect and an airtight effect are also acquired. Besides, the fine flowability of the conductive glue provides the multilayer thin film sensor structure with a fine interface compatibility, which makes the present invention applicable to the fields of touch control devices, display devices, sensors and feedback devices in future.

The present invention has been demonstrated with the embodiments described above. However, these embodiments are only to exemplify the present invention but not to limit the scope of the present invention. Any equivalent modification or variation according to the characteristic or spirit of the present invention is to be also included by the scope of the present invention.

What is claimed is:

1. A glue filling method for a multilayer thin film sensor structure, comprising steps:
   providing a multilayer thin film sensor structure having an upper surface, a lower surface and an electric-conduction through-hole penetrating said upper surface and said lower surface;
   providing a composite heat-resistant membrane including at least a first heat-resistant membrane, a second heat-resistant membrane and a third heat-resistant membrane, wherein a first patterned hole and a second patterned hole are respectively formed in said first heat-resistant membrane and said second heat-resistant membrane, corresponding to each other in location, and separately penetrating said first heat-resistant membrane and said second heat-resistant membrane, and wherein sizes of said first patterned hole and said second patterned hole are larger than a size of said electric-conduction through-hole, and wherein said third heat-resistant membrane is arranged between said first heat-resistant membrane and said second heat-resistant membrane, and wherein the first patterned hole and the second patterned hole are aligned to an axis;

sticking said composite heat-resistant membrane to said lower surface of said multilayer thin film sensor structure and aligning said first patterned hole to said electric-conduction through-hole to make said electric-conduction through-hole and said first patterned hole form a filling region;

filling a conductive glue into said filling region and letting said conductive glue protrude from said filling region toward said second patterned hole with said third heat-resistant membrane sustaining said conductive glue to form an arc-shaped bump; and curing said conductive glue to form an electric-conduction plug, and peeling off said composite heat-resistant membrane.

2. The glue filling method for a multilayer thin film sensor structure according to claim 1, wherein said conductive glue is cured in a thermosetting method.

3. The glue filling method for a multilayer thin film sensor structure according to claim 1 further comprises a step: after said conductive glue is cured, using an optical release method or a thermal release method to decrease stickiness of said composite heat-resistant membrane and then peeling off said composite heat-resistant membrane.

4. The glue filling method for a multilayer thin film sensor structure according to claim 1, wherein said composite heat-resistant membrane is made of polyethylene (PE), polyethylene terephthalate (PET), poly(methyl methacrylate) (PMMA), or a rubber.

5. The glue filling method for a multilayer thin film sensor structure according to claim 1, wherein after said conductive glue is cured, said electric-conduction plug has an upper cover and a lower cover respectively protruding from said upper surface and said lower surface, and wherein each of said upper cover and said lower cover is in form of an arc-shaped bump.

6. The glue filling method for a multilayer thin film sensor structure according to claim 5, wherein a diameter of said upper cover is larger than an upper diameter of said electric-conduction through-hole, and a diameter of said lower cover is larger than a lower diameter of said electric-conduction through-hole.

7. The glue filling method for a multilayer thin film sensor structure according to claim 6, wherein a plurality of conductive metals is respectively disposed on said upper surface and said lower surface of said multilayer thin film sensor structure, and wherein each of said upper cover and said lower cover covers a portion of said conductive metals.

8. The glue filling method for a multilayer thin film sensor structure according to claim 1, wherein said multilayer thin film sensor structure further includes at least a first sensing film and a second sensing film, and wherein said electric-conduction through-hole penetrates said first sensing film and said second sensing film.

9. The glue filling method for a multilayer thin film sensor structure according to claim 1, wherein said first heat-resistant membrane and said second heat-resistant membrane are adhesive, and said third heat-resistant membrane is non-adhesive.

* * * * *